United States Patent
Weiss et al.

(10) Patent No.: US 8,050,862 B2
(45) Date of Patent: Nov. 1, 2011

(54) VEHICULAR NAVIGATION SYSTEM FOR RECALLING PRESET MAP VIEWS

(75) Inventors: John P. Weiss, Shelby Township, MI (US); Patrik Lundblad, Gothenburg (SE); David E. Bojanowski, Clarkston, MI (US); Walter J. Holloway, Clinton Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1036 days.

(21) Appl. No.: 11/928,131

(22) Filed: Oct. 30, 2007

(65) Prior Publication Data
US 2009/0112465 A1    Apr. 30, 2009

(51) Int. Cl.
*G01C 21/30* (2006.01)
(52) U.S. Cl. ...................................................... 701/208
(58) Field of Classification Search .................. 701/28, 701/117, 200–202, 208, 209, 213; 340/988, 340/990, 995.11, 995.13, 995.14, 995.16, 340/995.17, 995.19
See application file for complete search history.

(56) References Cited

U.S. PATENT DOCUMENTS

| 6,653,948 B1 | 11/2003 | Kunimatsu et al. |
| 2005/0033511 A1* | 2/2005 | Pechatnikov et al. ......... 701/210 |
| 2005/0234637 A1* | 10/2005 | Obradovich et al. ......... 701/200 |

FOREIGN PATENT DOCUMENTS

| DE | 10027516 A1 | 12/2001 |
| EP | 1463014 A2 | 9/2004 |

OTHER PUBLICATIONS

Office Action issued on Feb. 23, 2010, for German Patent Application No. 102008052924.

* cited by examiner

*Primary Examiner* — Kim T Nguyen
(74) *Attorney, Agent, or Firm* — Ingrassia Fisher & Lorenz P.C.

(57) ABSTRACT

A vehicular navigation system includes a display, a memory configured to store data related to a plurality of preset map view, and a user input configured to permit the selection of a map view from the plurality of preset map views. A controller is coupled to the user input, the display, and the memory. The controller is configured to generate the selected map view on the display.

20 Claims, 5 Drawing Sheets

VEHICULAR NAVIGATION SYSTEM FOR RECALLING PRESET MAP VIEWS

TECHNICAL FIELD

The present invention generally relates to vehicles and, more particularly, to a vehicular navigation system for recalling preset map views.

BACKGROUND

It has become increasingly common to find global positioning system (GPS) navigation systems deployed on various types of vehicles, especially automobiles. A generalized vehicular navigation system includes a display (e.g., liquid crystal display), a user input, a GPS device, and a controller having a memory that stores a library or database of road maps. The navigation system may be removably coupled to the vehicle's dash or windshield (e.g., via a suction cup mount) and contain one or more batteries. Alternatively, the navigation system may be integrated into the vehicle's infrastructure (e.g., mounted within the vehicle's center stack) and draw power from the vehicle's battery.

During operation of the navigation system, the controller generates an image on the display representative of a portion of a road map. This image, referred to herein as a "map view," may be two-dimensional (e.g., a top-down planform view) or three-dimensional (e.g., a perspective view). The scale of the map view (i.e., the zoom level) may be fixed or adjusted by the user. Similarly, the rotational orientation of the map view may be fixed (e.g., with respect to north or to the vehicle's heading) or adjusted by the user. The map view may include graphics indicating roadways, the vehicle's location and heading, and various points-of-interests (e.g., restaurants, hotels, automated teller machines (ATMs), etc.). In addition, if the navigation system is equipped with a wireless receiver that receives traffic information from a traffic alert service, the generated map view may include graphics indicative of surrounding traffic conditions; e.g., roadways may be color-coded to indicate traffic density or flow, and icons may pinpoint the location of road construction, accidents, and other notable traffic incidents.

A driver may utilize a navigation system of the type described above to view successive stretches of a potential route of travel and assess current traffic conditions along each stretch. If the driver discovers unfavorable traffic conditions along a potential route of travel, he or she may choose an alternative route. In this manner, the driver may effectively bypass congested areas and thereby avoid spending excess time and resources on the road. Despite these advantages, a driver may be dissuaded from utilizing the navigation system to view the traffic conditions along potential routes of travel due to the somewhat cumbersome process of repeatedly adjusting (e.g., scrolling and zooming) the map view to show successive stretches along one or more routes of travel.

There thus exists an on-going need for a navigation system that permits a driver (or other user) to recall a desired preset map view utilizing a simple and intuitive process. Preferably, such a navigation system would also permit a driver to customize the preset map views to include areas frequently traveled by the driver. Other desirable features and characteristics of the present invention will become apparent from the subsequent detailed description and the appended claims, taken in conjunction with the accompanying drawings and the foregoing technical field and background.

SUMMARY

A vehicular navigation system includes a display, a memory configured to store data related to a plurality of preset map view, and a user input configured to permit the selection of a map view from the plurality of preset map views. A controller is coupled to the user input, the display, and the memory. The controller is configured to generate the selected map view on the display.

There is also provided a program product that includes a navigation display program and computer-readable media bearing the navigation display program. The navigation display program is adapted to store a plurality of preset map views, receive user selection data selecting a preset map view from the plurality of preset map views, and generate the selected preset map view.

DESCRIPTION OF THE DRAWINGS

The present invention will hereinafter be described in conjunction with the following drawing figures, wherein like numerals denote like elements, and.

DESCRIPTION OF AT LEAST ONE EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, brief summary, or the following detailed description.

Figure 1:
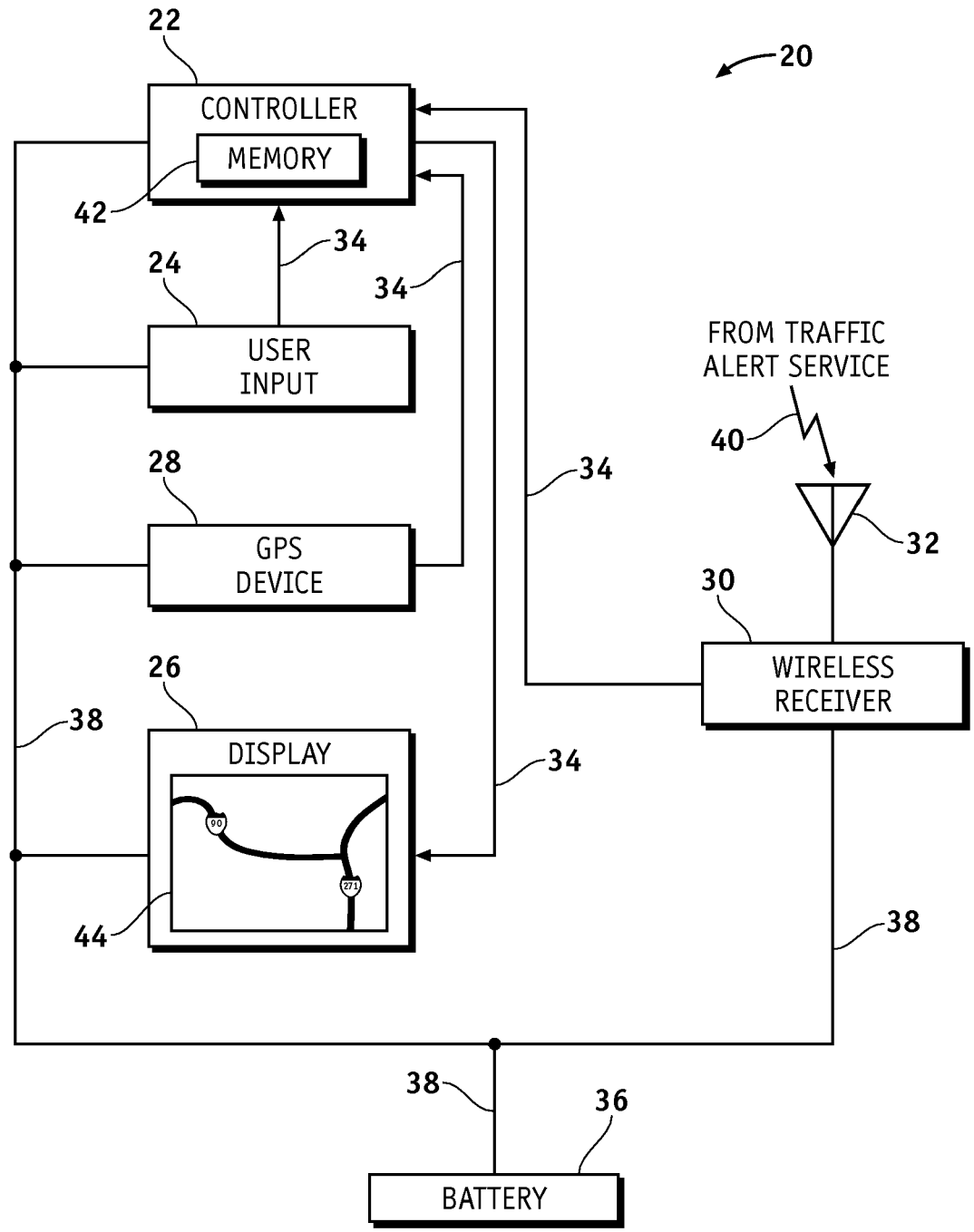
FIG. 1 is block diagram of a navigation system in accordance with a first exemplary embodiment.

FIG. 1 is block diagram of an exemplary navigation system 20 suitable for deployment on a vehicle, such as a motorcycle or automobile. Navigation system 20 comprises a controller 22, a user input 24, and a display 26 (e.g., a liquid crystal display). In this example, navigation system 20 also comprises a global positioning service (GPS) device 28 and a wireless receiver 30 having a radiofrequency antenna 32. A plurality of communications lines 34 operatively couple controller 22 to the other components of navigation system 20. As indicated in FIG. 1, a battery 36 may supply power to each of the components of navigation system 20 via connections 38; however, in alternative embodiments, navigation system 20 may draw power from the vehicle's battery.

During operation of navigation system 20, controller 22 receives signals from user input 24, GPS device 28, and wireless receiver 34; and controller 22 sends signals to display 26. The signals received from GPS device 28 are indicative of the vehicle's location (e.g., latitude and longitude) and, perhaps, heading and speed. The signals received from wireless receiver 30 are indicative of surrounding traffic conditions, which are reported to receiver 30 by a traffic alert service as indicated in FIG. 1 at 40. The signals received from user input 24 are indicative of operational commands entered by the vehicle's driver. To this end, user input 24 may comprise any device suitable for receiving such operational commands from a driver. For example, user input 24 may comprise a group of buttons, a scroll wheel, and/or a cursor device (e.g., a trackball). Additionally or alternatively, user input 24 may be integrated into display 26 as a touch-screen device. As a still further alternative, user input 24 may take the form of a microphone suitable for receiving voice commands from the driver.

Controller 22 may comprise any processing device suitable for performing the various methods, process, tasks, calculations, and display functions described herein below. In this respect, central controller 22 may include (or be associated with) any number of individual microprocessors, navigational equipment, memories, power supplies, storage devices, interface cards, and other standard components known in the art. Furthermore, controller 22 may include or cooperate with any number of software programs (e.g., navigation display programs) or instructions.

At least one memory 42 is associated with controller 22 and stores data relating to a library or database of roadmaps and other cartographic information (e.g., the locations of points-of-interest). Memory 42 may be integrated into navigation system 20 as an internal hard-drive or, instead, may take the form of a removable storage medium, such as a compact disc, a universal serial bus (USB) flash drive, a secure digital (SD) memory card, or the like. The library of roadmaps stored within memory 42 may be factory installed and subsequently updated with software or wireless downloads.

During operation of navigation system 20, controller 22 generates a portion of a roadmap stored in memory 42 as an image on display 26 (shown in FIG. 1 at 44). This image, referred to herein as a "map view," may be two-dimensional (e.g., a top-down planform view) or three-dimensional (e.g., a perspective view). The map view may be generally drawn to scale, although certain features (e.g., roadways) may be enlarged for greater clarity. The scale, or zoom level, of the map view may be fixed or may be adjusted by the user utilizing user input 24. Similarly, the orientation of the map view may be fixed (e.g., rotated relative to north or the vehicle's heading) or adjusted utilizing user input 24. The map view may include symbology representing roadways, the vehicle's location and heading, and possibly various points-of-interest. In addition, the map view may include graphics representative of traffic conditions occurring within the displayed area.

A driver may adjust the field of view (FOV) of the map view generated on display 26 utilizing user input 24 to view traffic conditions occurring along successive segments of a route of travel. However, as explained above, this may require that the driver make repeated and somewhat cumbersome manual adjustments utilizing user input 24. The following will thus describe an exemplary process that may be carried out by controller 22 of navigation system 20 to enable a user to rapidly recall a desired preset map view from a group or list of preset map views.

Figure 2:
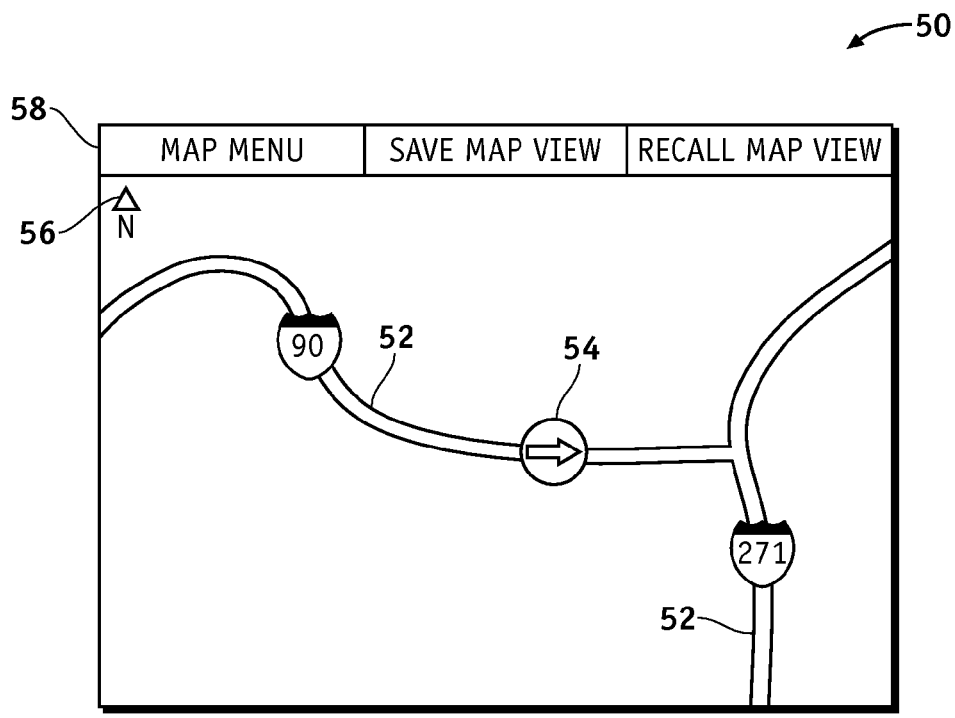
FIG. 2 is a first exemplary map view that may be generated on the display of the navigation system shown in FIG. 1.

FIG. 2 is an exemplary map view 50 that may be generated on display 26 by controller 22 of navigation system 20 (FIG. 1). Map view 50 includes graphics representative of roadways 52 (i.e., interstate 90 and interstate 271) and a symbol 54 indicating the location and heading of a vehicle carrying navigation system 20. Although not shown in FIG. 2 for clarity, it will be appreciated that other symbology, representative of traffic conditions, points-of-interest, and the like, may also be displayed within map view 50. As shown in FIG. 2, map view 50 may be centered with respect to the vehicle's location (again, represented by symbol 54) and rotationally oriented with respect to north (indicated by compass symbol 56).

In the illustrated exemplary embodiment, map view 50 includes a graphical menu 58 including three features, namely, a MAP MENU feature, a SAVE MAP VIEW feature, and a RECALL MAP VIEW feature. A driver may select among the features of menu 58 utilizing user input 24. For example, if user input 24 is a cursor device, the driver may navigate the cursor to a desired one of the menu features and then select the feature (e.g., by depressing a button). Alternatively, if user input 24 is integrated into display 26 as a touch-screen device, a driver may touch the area of display 26 containing the desired menu feature. As a final example, if user input 24 is a microphone, a user may simply pronounce the desired menu feature to select the menu feature.

Figure 3:
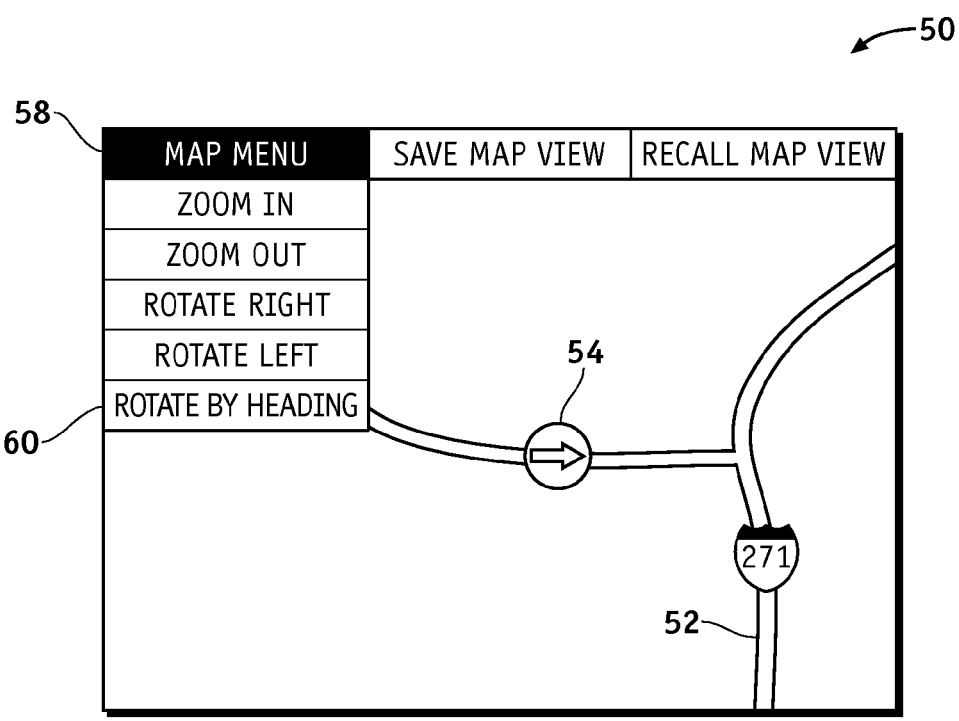
FIG. 3 is the map view shown in FIG. 2 illustrating one manner in which map orientation and zoom level may be adjusted.

FIG. 3 illustrates map view 50 after the selection of the MAP MENU feature. In response to the selection of the MAP MENU feature, controller 22 has generated a drop-down menu 60, which contains several options associated with the MAP MENU feature. In this case, drop-down menu 60 includes two feature options pertaining to the zoom level of map view 50 (i.e., the ZOOM IN and ZOOM OUT options), and three feature options pertaining to the rotational orientation setting of map view 50 (i.e., the ROTATE RIGHT, ROTATE LEFT, and ROTATE BY HEADING options). By selecting amongst this list of feature options utilizing user input 24, a driver may thus adjust the zoom level and rotational orientation of map view 50 to preference.

Figure 4:
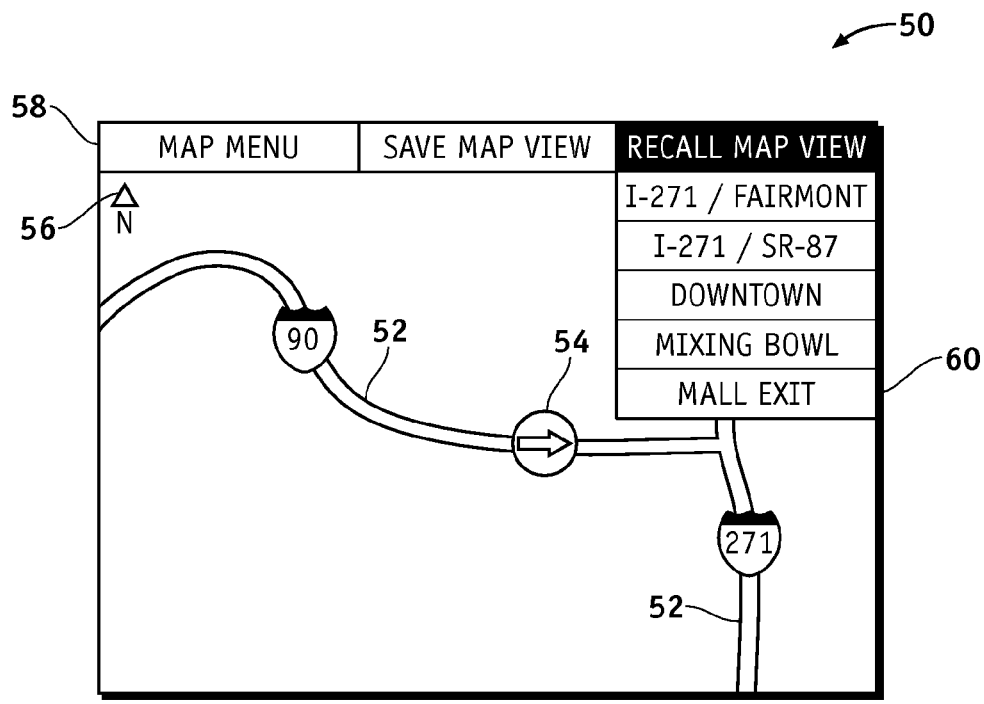
FIG. 4 is the map view shown in FIG. 2 illustrating one manner in which a map view may be selected from a plurality of preset map views.

Referring still to FIG. 3, it can be seen that feature menu 58 also includes RECALL MAP VIEW feature. When the RECALL MAP VIEW feature is selected utilizing user input 24, controller 22 may generate a secondary menu including a plurality of graphic identifiers each representing a different preset map view stored in memory 42 (FIG. 1). For example, as shown in FIG. 4, controller 22 may generate a drop-down menu 62 containing a list of text labels each designating a different preset map view. In FIG. 3, five such text labels are shown: i.e., 1-271/SR-87, 1-271/FAIRMONT, DOWNTOWN, MIXING BOWL, and MALL EXIT. When a driver selects a text label utilizing user input 24, controller 22 generates the map view associated with the selected text label on display 26. This may be appreciated by referring to FIG. 5, which illustrates a second map view 62 that may be generated by controller 22 on display 26 after a user has selected the text label "I-271/SR-87."

To permit controller 22 to recall a selected preset map view, memory 42 stores data related to a plurality of preset map views. This data includes information regarding the location of the preset map view; e.g., the longitude and latitude of at least one reference point, which may be the center location of the map view. The data stored in memory 42 may also include an identifier (e.g., a graphic, such as a text label) associated with the preset map view. In addition, this data may include one or more of the following: a user-defined zoom level, rotational orientation setting, and/or perspective (e.g., two-dimensional planform view, three-dimensional perspective view, etc.) associated with each of the preset map views. When the preset map view is selected and generated on display 26, the map view may be draw to the previously-saved zoom level, rotational orientation, and/or perspective. Otherwise, the map view may be generated utilizing a current or a default zoom level, rotational orientation, and/or perspective.

Figure 5:
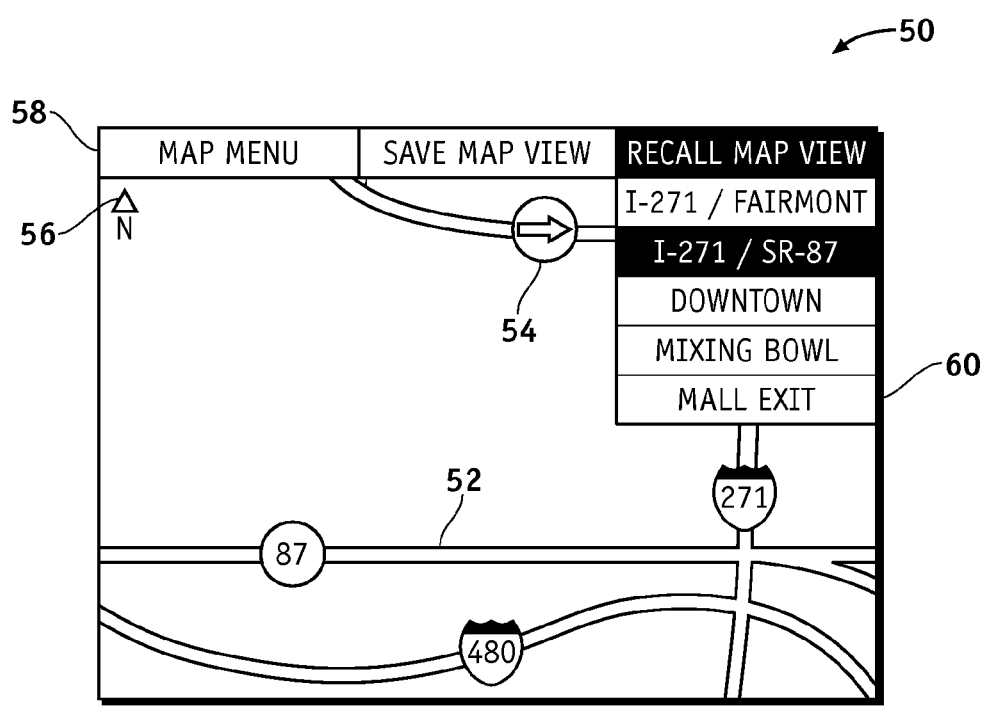
FIG. 5 is a second exemplary map view that may be recalled when selected from the plurality of preset map views shown in FIG. 4.

In the foregoing example, text labels were employed to designate each map view in a plurality of preset map views; however, it should be appreciated that other identifiers may be utilized to represent the different map views, including thumbnail images. Also, in certain embodiments, the preset map views may not have any stored identifiers associated therewith. For example, in an embodiment wherein user input 24 comprises a plurality of push buttons, a driver may simply push a button to recall a preset map view. However, if text labels are employed, the text labels may be established by controller 22 as a generic title (e.g., VIEW 1, VIEW 2, etc.) or as a location-specific title. For example, as indicated in FIG. 5, the text label may be derived from a major intersection located near the center of the map view (e.g., interstate 271 and state route 87). Furthermore, navigation system 20 may also be configured to permit a driver to create his or her own text label for a preset map view utilizing user input 24 as described below.

The preset map views stored in memory 42 may be established by the manufacture or installed via software or wireless download. In this case, the preset map views may include map views of commonly-traveled and congested geographical locations, such as John F. Kennedy Airport. A driver may also install via software or wireless download a list of preset map views of areas located within a particular geographic region, such as Los Angeles. Also, in certain embodiments, navigation system 20 may be configured to enable a driver to save customized preset views as described more fully below in conjunction with FIGS. 6 and 7.

Figure 6:
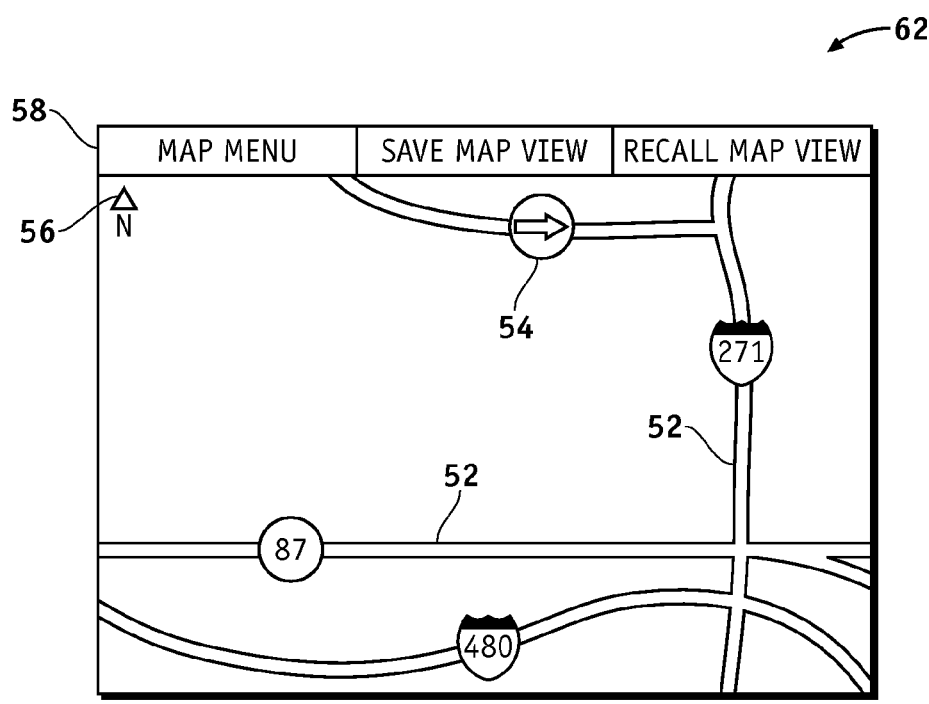
FIG. 6 is a second exemplary map view that may be generated on the display of the navigation system shown in FIG. 1.
Figure 7:
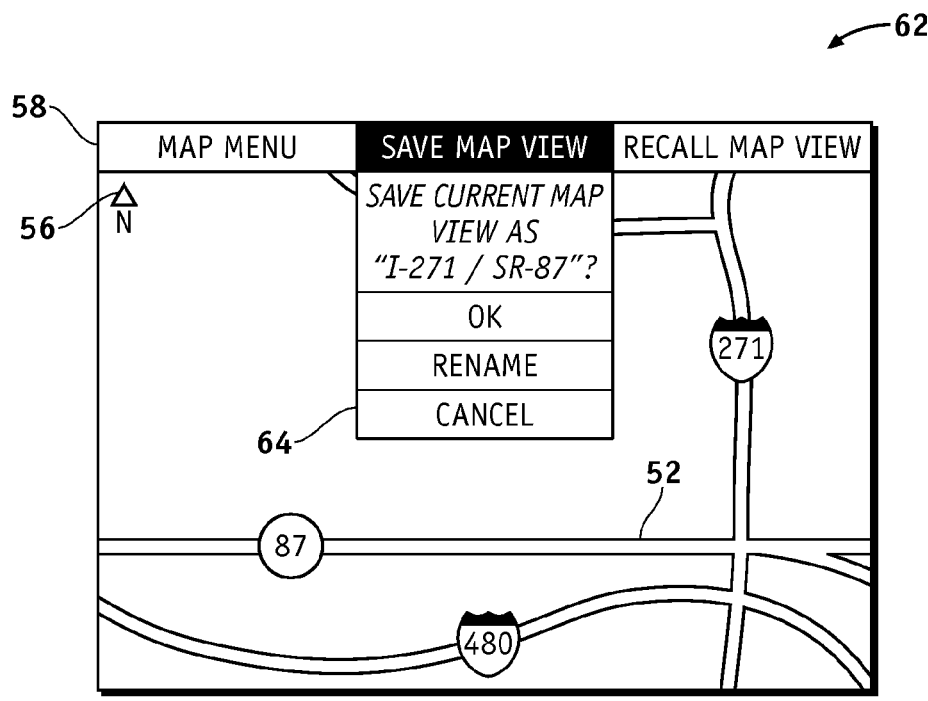
FIG. 7 is the map view shown in FIG. 4 illustrating one manner in which the current map view may be stored as a preset map view.

A driver (or other user) may utilize navigation system 20 to store a desired map view as a preset map view in the following manner. First, a driver may manipulate (e.g., scroll, zoom, and/or rotate) the currently-displayed map view until a desired map view is shown on display 26. FIG. 6 illustrates a second exemplary map view 62 that may be generated on display 26 after a driver has scrolled map view 50 (FIG. 2) downward. Next, the driver selects the SAVE MAP VIEW feature from menu 58 utilizing user input 24. Controller 22 subsequently generates a second menu 64 including an option to save the current map view as a preset map view (referred to herein as a "save current map view option"). In particular, as shown in FIG. 7, controller 22 may generate a drop-down menu 64 containing a prompt (e.g., SAVE CURRENT MAP VIEW AS "I-271/SR-87") and a plurality of feature options (e.g., an OKAY, RENAME, and CANCEL option). If the driver selects the OKAY option, current map view will be stored with the text label "I-271/SR-87." When the driver later wishes to recall the stored map view, he or she simply activates the RECALL MAP VIEW feature from menu 58 and then selects "I-271/SR-87" therefrom. If the driver selects the CANCEL option from drop-down menu 64, drop-down menu 64 may disappear. Lastly, if the driver selects the RENAME option, the driver may create a unique text label for the newly-stored map view utilizing user input 24.

There has thus been described a navigation system that permits a driver (or other user) to recall a desired preset map view utilizing a simple and intuitive process. In certain embodiments, the navigation system also permits a driver to customize the preset map views to include areas frequently traveled by the driver. If desired, navigation system 20 may also be configured to calculate route and automatically segment the route into a plurality of successive preset map views. In this manner, navigation system 20 may permit the driver to view the entire route by cycling through the preset map views.

Figure 8:
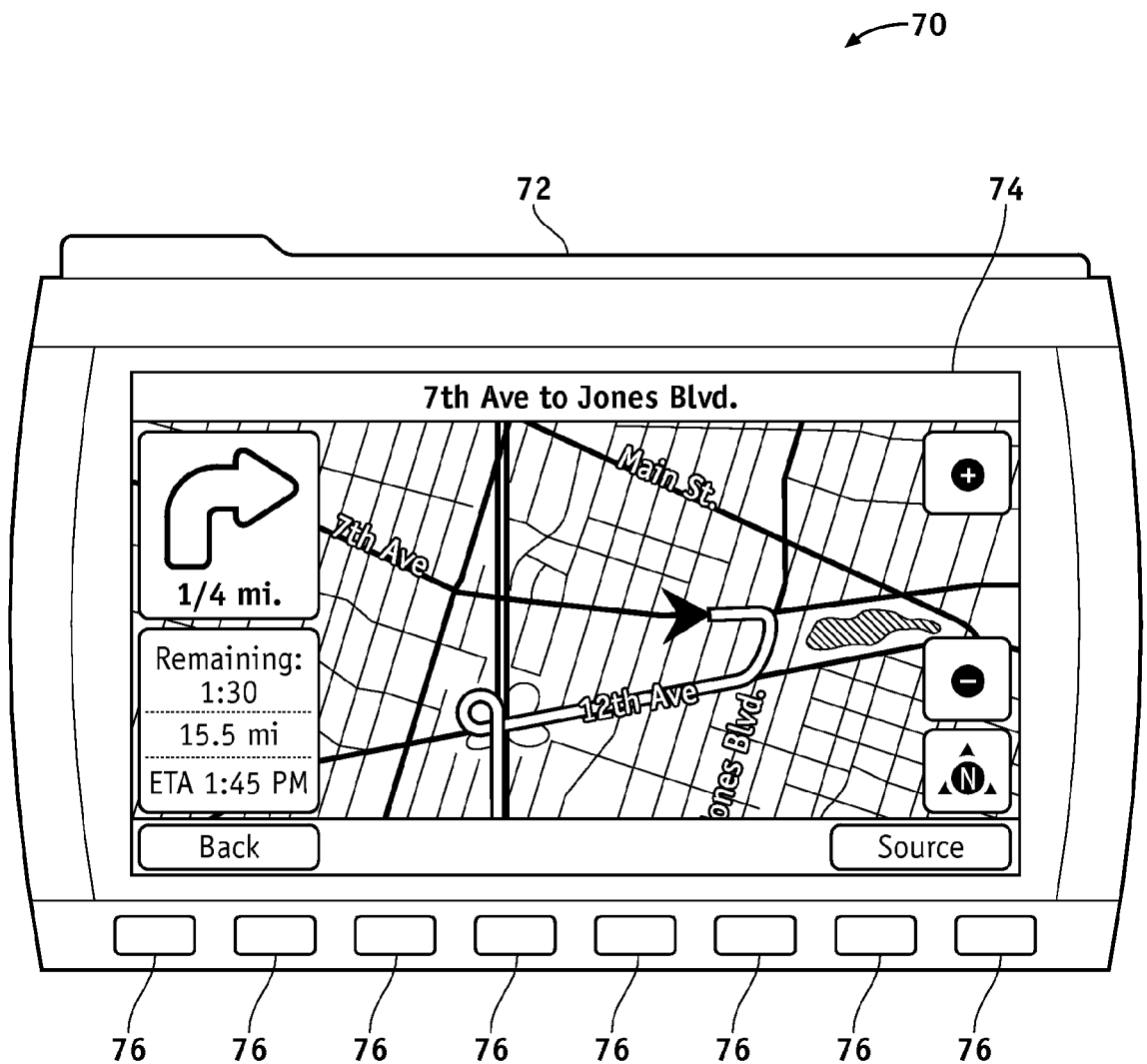
FIG. 8 is an isometric view of a navigation system having a plurality of map preset buttons in accordance with an additional exemplary embodiment.

In the foregoing example, navigation system 20 was described as employing graphical drop-down menus to permit a user to save and recall preset map views. This example notwithstanding, it should be appreciated that, if a graphical menu is employed by the navigation system, the appearance of the menu will inevitably vary amongst different embodiments. In further embodiments, navigation system 20 may instead utilize an audible menu structure. In still further embodiments, the navigation system may not employ an interactive menu structure, but may instead include several buttons mounted on the exterior of the housing of the navigation system dedicated to performing the functions described above. To further illustrate this point, FIG. 8 provides an isometric view of a navigation system 70 that includes a housing 72 and a display 74. A group of map preset buttons 76 are mounted on the exterior of housing 72. In this example, navigation system 70 is configured such that map preset buttons 76 perform a function similar to that performed by radio preset buttons on a conventional vehicle audio system. That is, each preset button 76 is associated with a different map view stored in a memory of navigation system 70. When a driver briefly taps one of map preset buttons 76 (i.e., depresses the selected preset button 76 for a time period less than a predetermined time period), the preset map associated with the depressed preset button 76 is displayed on display 74. Furthermore, when a desired preset button 76 is depressed and held for the predetermined time period (e.g., three seconds), the currently-displayed map view is stored as the preset map view associated with the desired preset button 76. If desired, navigation system 70 may be configured to generate an alert (e.g., an audible beep) when the currently-displayed map view has been stored in this manner.

While at least one exemplary embodiment has been presented in the foregoing detailed description, it should be appreciated that a vast number of variations exist. It should also be understood that the embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A vehicular navigation system, comprising:
   a display;
   a memory configured to store data related to a plurality of preset map views;
   a user input configured to permit the selection of a map view from the plurality of preset map views; and
   a controller coupled to the user input, the display, and the memory, the controller configured to generate the selected map view on the display.

2. A vehicular navigation system according to claim 1 further comprising a wireless receiver configured to receive traffic information, the controller coupled to the wireless receiver and configured to generate graphics on the display indicative of the received traffic information.

3. A vehicular navigation system according to claim 1 wherein the data comprises a reference point associated with each map view in the plurality of present map views.

4. A vehicular navigation system according to claim 3 wherein the data further comprises a plurality of graphic identifiers each associated with a different map view in the plurality of map views.

5. A vehicular navigation system according to claim 4 wherein at least one of graphic identifiers in the plurality of graphic identifiers is a text label.

6. A vehicular navigation system according to claim 5 wherein the text label is user-created.

7. A vehicular navigation system according to claim 4 wherein the controller is configured to selectively generate a menu including at least one of the plurality of graphic identifiers.

8. A vehicular navigation system according to claim 3 wherein the data further comprises a plurality of zoom levels each associated with a different map view in the plurality of map views.

9. A vehicular navigation system according to claim 3 wherein the data further comprises a plurality of orientation settings each associated with a different map view in the plurality of map views.

10. A vehicular navigation system according to claim 1 wherein the controller and user input are further configured to permit a user to store a specified map view as one of the plurality of preset map views.

11. A vehicular navigation system according to claim 10 wherein the controller and user input are further configured to permit a user to store the currently displayed map view as a newly-stored map view in the plurality of preset map views.

12. A vehicular navigation system according to claim 10 wherein the controller is configured to establish a text label for the newly-stored map view.

13. A vehicular navigation system according to claim 12 wherein the text label is derived from at least one roadway shown in the newly-stored map view.

14. A vehicular navigation system according to claim 10 wherein the controller and user input are further configured to permit a user to create a text label for the newly-stored map view.

15. A vehicular navigation system according to claim 1 wherein in the controller is further configured to:
   determine a route of travel;
   save a first map view corresponding to a first portion of the route of travel as a first one of the plurality of preset map views; and
   save a second map view corresponding to a second portion of the route of travel as a second one of the plurality of preset map views.

16. A vehicular navigation system according to claim 1 further comprising:
   a first preset button having a first map view in the plurality of preset map views associated therewith; and
   a second preset button having a second map view in the plurality of preset map views associated therewith;
   wherein the controller is configured to generate the first map view on the display when the first preset button is tapped and to generate the second map view on the display when the second preset button is tapped.

17. A vehicular navigation system according to claim 16 wherein the controller is further configured to store the currently displayed map view as the first map view when the first preset button is depressed and held for a predetermined time period.

18. A vehicular navigation system, comprising:
   a display;
   a memory configured to store data related to the location of each map view in a plurality of map views;
   a user input configured to permit the selection of a map view from the plurality of preset map views and the activation of a save current map view option; and
   a controller coupled to the user input, the display, and the memory, the controller configured to:
   generate the selected map view on the display; and
   store the map view currently displayed on the display as one of the preset map views when the save current map view option is activated.

19. A program product, comprising:
   a navigation display program adapted to:
   store a plurality of preset map views;
   receive user selection data selecting a preset map view from the plurality of preset map views; and
   generate the selected preset map view; and
   a non-transitory computer-readable medium bearing the navigation display program.

20. A program product according to claim 19 wherein the navigation display program is further configured to:
   provide a save current map view option; and
   save the current map view as one of the plurality of preset map views when the save current view option is activated.

* * * * *